US009117281B2

(12) United States Patent
Hoiem et al.

(10) Patent No.: US 9,117,281 B2
(45) Date of Patent: Aug. 25, 2015

(54) SURFACE SEGMENTATION FROM RGB AND DEPTH IMAGES

(75) Inventors: Derek Hoiem, Champaign, IL (US); Pushmeet Kohli, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 13/287,577

(22) Filed: Nov. 2, 2011

(65) Prior Publication Data
US 2013/0107010 A1 May 2, 2013

(51) Int. Cl.
G06K 9/00 (2006.01)
G06T 7/00 (2006.01)
G06T 7/60 (2006.01)
H04N 13/02 (2006.01)
G06K 9/46 (2006.01)

(52) U.S. Cl.
CPC ............... *G06T 7/0081* (2013.01); *G06K 9/00* (2013.01); *G06K 9/46* (2013.01); *G06T 7/00* (2013.01); *G06T 7/0051* (2013.01); *H04N 13/02* (2013.01); *H04N 13/0239* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |

(Continued)

FOREIGN PATENT DOCUMENTS

| CN | 101283375 B | 10/2008 |
| CN | 201254344 B | 6/2010 |

(Continued)

OTHER PUBLICATIONS

Kohli, Pushmeet, J. Rihan, and M. Bray, "Simultaneous segmentation and pose estimation of humans using dynamic graph cuts", International Journal of Computer Vision, 79.3, pp. 285-298, Sep. 2008.*

(Continued)

*Primary Examiner* — William C Vaughn, Jr.
*Assistant Examiner* — Lindsay Uhl
(74) *Attorney, Agent, or Firm* — Steve Wight; Judy Yee; Micky Minhas (57) ABSTRACT

Surface segmentation from RGB and depth images is described. In one example, a computer receives an image of a scene. The image has pixels which each have an associated color value and an associated depth value representing a distance between from an image sensor to a surface in the scene. The computer uses the depth values to derive a set of three-dimensional planes present within the scene. A cost function is used to determine whether each pixel belongs to one of the planes, and the image elements are labeled accordingly. The cost function has terms dependent on the depth value of a pixel, and the color values of the pixels and at least one neighboring pixel. In various examples, the planes can be extended until they intersect to determine the extent of the scene, and pixels not belonging to a plane can be labeled as objects on the surfaces.

20 Claims, 6 Drawing Sheets

(56) References Cited

U.S. PATENT DOCUMENTS

| | | |
|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,246,412 B1 * | 6/2001 | Shum et al. ............... 345/419 |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,711,155 B1 * | 5/2010 | Sharma et al. ............... 382/118 |

(56) References Cited

U.S. PATENT DOCUMENTS

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0026838 | A1 | 1/2008 | Dunstan et al. |
| 2009/0129666 | A1 | 5/2009 | Goevert et al. |
| 2011/0085028 | A1 | 4/2011 | Samadani et al. |
| 2011/0175984 | A1 | 7/2011 | Tolstaya et al. |
| 2011/0249190 | A1 | 10/2011 | Nguyen et al. |
| 2012/0250978 | A1* | 10/2012 | Taylor ........................... 382/154 |

FOREIGN PATENT DOCUMENTS

| | | |
|---|---|---|
| EP | 0583061 A2 | 2/1994 |
| EP | 1278159 A2 | 5/2011 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 03/081529 A1 | 10/2003 |

OTHER PUBLICATIONS

Szummer, Martin, P. Kohli, and D. Hoiem, "Learning CRFs using graph cuts", D. Forsyth, P. Torr, and A. Zisserman (Eds.): ECCV 2008, Part II, LNCS 5303, pp. 582-595, 2008.*

Taylor, Camillo J. and A. Cowley, "Fast Scene Analysis Using Image and Range Data", 2011 IEEE International Conference on Robotics and Automation, IEEE, May 2011.*

Scharstein, Daniel and C. Pal, "Learning Conditional Random Fields for Stereo", CVPR '07, IEEE Conference on Computer Vision and Pattern Recognition, pp. 1846-1853, IEEE, 2007.*

Segvic, Sinisa and S. Ribaric, "Determining the Absolute Orientation in a Corridor Using Projective Geometry and Active Vision" IEEE Transactions on Industrial Electronics, vol. 48, No. 3, Jun. 2001.*

Whittaker, R. T., J. Gregor, and P.F. Chen, "Indoor Scene Reconstruction from Sets of Noisy Range Images", Second International Conference on 3-D Digital Imaging and Modeling, pp. 348-357, IEEE Computer Society, 1999.*

Hedau, V., D. Hoiem, and D. Forsyth, "Thinking Inside the Box: Using Appearance Models and Context Based on Room Geometry", Computer Vision ECCV 2010, Proceedings 11$^{th}$ European Conference on Computer Vision: 224-37, 2010.*

Abdoshshah, K.and A. Klinger, "Weighted Line-Finding Algorithm", Proceedings of the Society of Photo-Optical Instrumentation Engineers, 205: 102-107, 1979.*

Bao, Sid Yingze; Sun, Min; Savarese, Silvio; "Toward Coherent Object Detection and Scene Layout Understanding", Image and Vision Computing 29, pp. 569-579 (May 2011).*

R. I. Hartley and A. Zisserman, Multiple View Geometry in Computer Vision. Cambridge University Press, 2nd edition, 2004 pp. 24-150.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Del Peroy, et al; "Sampling Bedrooms"; 2011; http://kobus.ca/research/publications/11/CVPR-11-1958.pdf.

Taylor, et al; "Segmentation and Analysis of RGB-d data"; Jun. 27, 2011; Robotics Science and Systems (RSS) conference 2011; pp. 1011-1018; http://www.cs.washington.edu/ai/Mobile_Robotics/rgbd-workshop-2011/camera_ready/taylor-rgbd11-segmentation.pdf.

(56) References Cited

OTHER PUBLICATIONS

Wang, et al; "Discriminative Learning with Latent Variables for Cluttered Indoor Scene Understanding"; 2010; ECCV'10 Proceedings of the 11th European conference on Computer vision: Part IV; pp. 497-510; Stanford University, CA, US http://users.cecs.anu.edu.au/~sgould/papers/eccv10-indoor.pdf.

Holz, et al; "Real-Time Plane Segmentation using RGB-D Cameras"; 2011; The 15th RoboCup International Symposium; http://www.ais.uni-bonn.de/papers/robocup2011_holz.pdf.

Swadzba, et al; "Indoor Scene Classification using combined 3D and Gist Features"; 2010; ACCV'10 Proceedings of the 10th Asian conference on Computer vision—vol. Part II; pp. 201-215; http://aiweb.techfak.uni-bielefeld.de/files/accv-10-3dic.pdf.

Kowdle et al; "Scribble Based Interactive 3d Reconstruction via Scene Co-Segmentation"; 2011; IEEE International Conference on Image Processing 2011; http://ttic.uchicago.edu/~dbatra/publications/assets/kcbc_icip11.pdf.

Arbelaez et al; "From contours to regions: An empirical evaluation"; In CVPR, 2009. http://ieeexplore.ieee.org/stamp/stamp.jsp?tp=&arnumber=5206707.

Coughlan et al; "Manhattan world: orientation and outlier detection by Bayesian inference" Neural Computation, 15(5), 2003. http://www.ski.org/Rehab/Coughlan_lab/General/Publications/manhattan_nc.pdf.

Gupta, et al; "From 3d scene geometry to human workspace"; In CVPR, 2011. http://research.satkin.com/papers/cvpr_2011.pdf.

Hedau et al; "Recovering the spatial layout of cluttered rooms" In ICCV, 2009. http://ieeexplore.ieee.org/stamp/stamp.jsp?tp=&arnumber=5459411.

Hoiem, et al; "Geometric context from a single image"; In ICCV, 2005. http://www.cs.uiuc.edu/homes/dhoiem/publications/Hoiem_Geometric.pdf.

Hoiem, et al; "Recovering occlusion boundaries from an image" In ICCV, 2007. http://www.ri.cmu.edu/pub_files/pub4/hoiem_derek_2007_3/hoiem_derek_2007_3.pdf.

Kosecka et al; "Video compass" In ECCV. Springer-Verlag, 2002. http://www.cs.gmu.edu/~kosecka/Publications/eccv02.pdf.

Lee et al; "Estimating spatial layout of rooms using volumetric reasoning about objects and surfaces" In NIPS, 2010. http://www.cs.cmu.edu/~dclee/pub/nips2010.pdf.

Lee et al; "Geometric reasoning for single image structure recovery" In CVPR, 2009. http://www.cs.cmu.edu/~dclee/pub/cvpr09lee.pdf.

Lowe et al; "Distinctive image features from scaleinvariant keypoints" International Journal of Computer Vision, 60(2):91-110, 2004. http://citeseerx.ist.psu.edu/viewdoc/download?doi=10.1.1.157.3843&rep=rep1&type=pdf.

Martin et al; "Learning to detect natural image boundaries using local brightness, color, and texture cues"; IEEE Trans. on Pattern Analysis and Machine Intelligence, 26(5):530-549, 2004. http://www.cs.berkeley.edu/~malik/papers/MFM-boundaries.pdf.

Hedau et al; "Thinking inside the box: Using appearance models and context based on room geometry" In ECCV, 2010. http://www.cs.uiuc.edu/homes/dhoiem/publications/eccv2010_InsideTheBox_varsha.

"First Office Action and Search Report Issued in Chinese Patent Application No. 201210430744.8", Mailed Date: Nov. 4, 2014, 13 Pages.

Fernandez, et al., "Image Segmentation Combining Region Depth and Object Features", Proceedings. 15th International Conference on Pattern Recognition, vol. 01, Sep. 7, 2000, pp. 618-621.

"International Search Report & Written Opinion for PCT Patent Application No. PCT/US2012/063132", Mailed Date: Mar. 4, 2013, Filed Date: Nov. 2, 2012, 9 Pages.

"Supplementary European Search Report for European Patent Application No. 12844733.1", Mailed Date: May 6, 2015, 2 pages.

Gallup, et al., "Piecewise Planar and Non-Planar Stereo for Urban Scene Reconstruction" in IEEE Conference on Computer Vision and Pattern Recognition, Jun. 13, 2010, pp. 1418-1425.

Holz, Dirk et al., "Real-Time Plane Segmentation Using RGB-D Cameras" Proceedings of 15th RoboCup International Symposium, Jul. 1, 2011, pp. 1-12.

Taylor, Camillo J. et al., "Segmentation and 1-10 Analysis of RGB-D data" RSS 2011 Workshop on RGB-D Cameras, Jun. 1, 2011.

"Office Action Received for European Patent Application No. 12844733.1", Mailed Date: May 18, 2015, 5 pages.

"Second Office Action and Search Report Received for Chinese Patent Application No. 201210430744.8", Mailed Date: Jun. 17, 2015, 19 pages.

\* cited by examiner

SURFACE SEGMENTATION FROM RGB AND DEPTH IMAGES

BACKGROUND

Computer interpretation of indoor scenes is useful for numerous applications such as robotics, security, and interactive gaming. One aspect of automated indoor scene interpretation is the determination of the 3D plane parameters and extents for the wall, ceiling, floors, and supporting surfaces. Determining this can enable the computer to derive information such as the size of the room and the location of objects within it.

However, whilst indoor scenes are often highly structured, they can be complex. For example, from any given viewpoint, large portions of the scene may be occluded, requiring reasoning beyond visible surfaces by the computer. Some techniques for interpreting indoor scenes from images use simple models of geometry from perspective cues, or attempt to infer a metric representation, but can struggle if the occlusion is too great.

The embodiments described below are not limited to implementations which solve any or all of the disadvantages of known indoor scene interpretation techniques.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Surface segmentation from RUB and depth images is described. In one example, a computer receives an image of a scene. The image has pixels which each have an associated color value and an associated depth value representing a distance between from an image sensor to a surface in the scene. The computer uses the depth values to derive a set of three-dimensional planes present within the scene. A cost function is used to determine whether each pixel belongs to one of the planes, and the image elements are labeled accordingly. The cost function has terms dependent on the depth value of a pixel, and the color values of the pixels and at least one neighboring pixel. In various examples, the planes can be extended until they intersect to determine the extent of the scene, and pixels not belonging to a plane can be labeled as objects on the surfaces.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
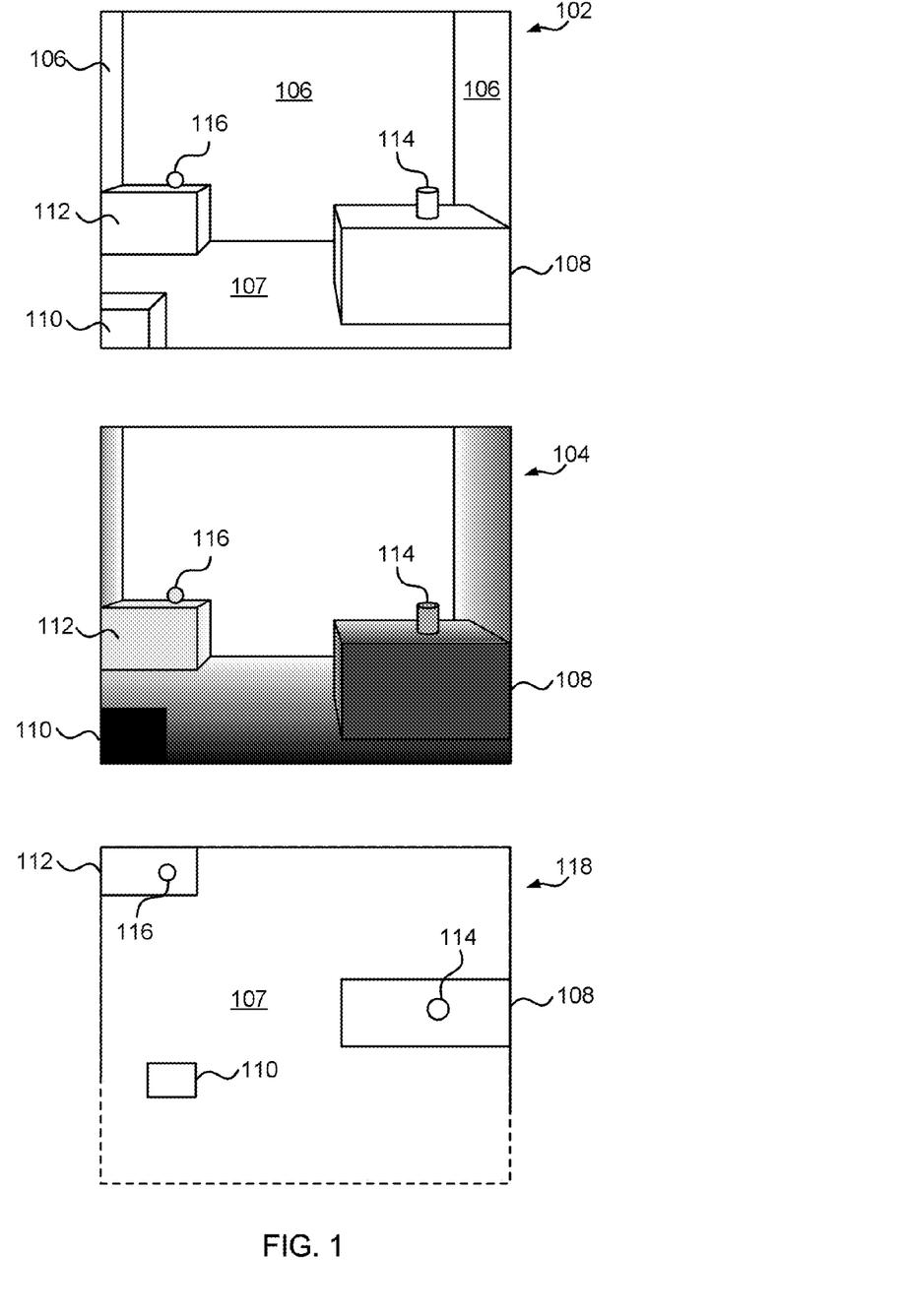
FIG. 1 illustrates an RGB and depth image of a scene and an interpreted overhead view.

FIG. 1 illustrates an example of the type of interpretation that is performed on an indoor scene using the technique described below. FIG. 1 shows a red-green-blue or RGB image 102 of an example indoor scene as captured by a visible light camera, and a depth image 104 of the same scene as captured by a depth camera.

The RGB image 102 is made up of a plurality of image elements, each indicating a visible light color value (e.g. RGB intensity) for that point of the image. Note that the term "image element" is used hereinafter to refer to a pixel, group of pixels, voxel or other higher level component of an image. Note that in some examples, the visible light image does not have to be in the form of an RGB image, but can use any type of suitable color value representation. The RGB image 102 shows various elements of a typical indoor scene, including walls 106, a floor 107, a first object 108 up against the right-hand wall, a second object 110 near to the camera, and a third object 112 in the left-hand corner of the room. The first, second and third objects are all large object that have supporting surfaces such as tables, chairs, couches etc. In other words, additional objects can be placed onto these objects. For example, FIG. 1 shows a cup 114 placed on the first object 108, and a ball 116 placed on top of the third object 112.

The depth image 104 shows the same scene as the RGB image 102 and also comprises a plurality of image elements. However, in the depth image 104, each image element does not represent a color, but instead represents a distance between the depth camera and an object or surface at that point in the scene. In the example of FIG. 1, the distance is represented as a grayscale value, where a black image element represents a near value, and a white image element represents a far value, with shades of gray in-between. Note that the black edging lines around the objects in FIG. 1 are merely for clarity, and are not present in a real depth image.

The combination of the RGB image 102 and the depth image 104 together therefore provides information on both the color and spatial layout of objects in the scene. The image segmentation technique described below uses these two sources of information on the scene to interpret the layout of the indoor environment. This is illustrated in overhead view 118 of FIG. 1. The overhead view indicates the extent of the room, i.e. where the boundary walls 106 meet. This is determined automatically as described below, even when this is occluded from view. For example, in FIG. 1, both of the corners of the room where the floor meets the far walls are occluded by objects. The overhead view 118 also indicates the location of the objects within the room relative to the boundary walls.

Note that the overhead view is only one possible interpretation of the scene and is provided for ease of graphical representation. The technique described below can also interpret the scene from any other perspective, in both 2D and 3D.

Figure 2:
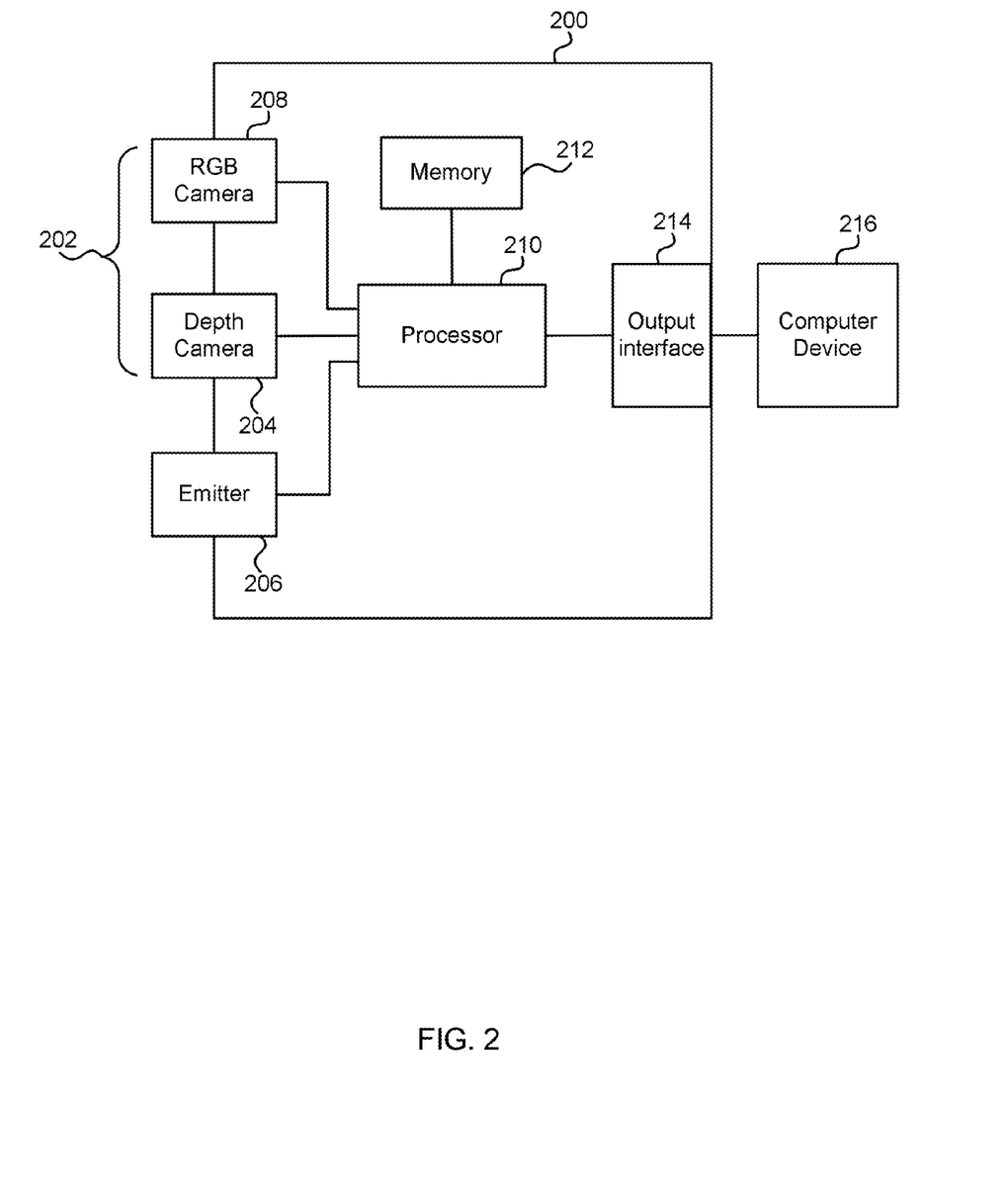
FIG. 2 illustrates a schematic diagram of a capture device for capturing RGB and depth images.

Reference is now made to FIG. 2, which illustrates a schematic diagram of a capture device 200 that can be used to capture the RGB image 102 and depth image 104 of the scene as illustrated in FIG. 1. As shown in FIG. 2, the capture device 200 comprises at least one image sensor 202. In the example shown in FIG. 2, the image sensor 202 comprises a depth camera 204 arranged to capture a depth image of a scene. An noted above, the captured depth image can include a 2D area of the captured scene where each image element in the 2D area represents a depth value such as a length or distance from the depth camera 204 to an object in the captured scene.

The depth information can be obtained using any suitable technique including, for example, time-of-flight, structured light, stereo image, or the like. In some examples, the capture device 200 can organize the depth information into "Z layers," or layers that may be perpendicular to a Z-axis extending from the depth camera along its line of sight.

The capture device 200 can also include an emitter 206 arranged to illuminate the scene in such a manner that depth information can be ascertained by the depth camera 204. In one example, the capture device 200 can use structured light to capture depth information. In such a technique, patterned light (e.g., light displayed as a known pattern such as dot, grid or stripe pattern) can be projected onto the scene using the emitter 206. The patterned light may be infra-red (IR) light, e.g. from a laser, such that it is not visible to the human eye. Upon striking the surface of one or more targets or objects in the scene, the pattern becomes deformed. Such a deformation of the pattern can be captured by the depth camera 204 (Which can be sensitive to IR light) and then analyzed to determine a physical distance from the capture device 200 to a location on the objects in the scene.

In another example, in the case that the depth camera 204 is an IR time-of-flight camera, the emitter 206 emits IR light onto the scene, and the depth camera 204 is arranged to detect backscattered light from the surface of one or more targets and objects in the scene. In some examples, pulsed infrared light can be emitted from the emitter 206 such that the time between an outgoing light pulse and a corresponding incoming light pulse can be detected by the depth camera and measured and used to determine a physical distance from the capture device 200 to a location on the targets or objects in the scene. Additionally, in some examples, the phase of the outgoing light wave from the emitter 206 can be compared to the phase of the incoming light wave at the depth camera 204 to determine a phase shift. The phase shift can then be used to determine a physical distance from the capture device 200 to a location on the targets or objects. In a further example, time-of-flight analysis can be used to indirectly determine a physical distance from the capture device 200 to a location on the targets or objects by analyzing the intensity of the reflected beam of light over time via various techniques including, for example, shuttered light pulse imaging.

In another example, the depth camera 204 can be in the form of two or more physically separated cameras that view a scene from different angles, such that visual stereo data is obtained that can be resolved to generate depth information. In this case the emitter 206 can be used to illuminate the scene or can be omitted.

In addition to the depth camera 204, the image sensor 202 also comprises a regular camera, which is referred to as an RGB camera 208. The RGB camera 208 is arranged to capture images of the scene at visible light frequencies, in the manner described above.

The capture device 200 shown in FIG. 2 further comprises at least one processor 210, which is in communication with the image sensor 202 (i.e. depth camera 204 and RGB camera 208 in the example of FIG. 2) and the emitter 206. The processor 210 can be a general purpose microprocessor, or a specialized signal/image processor. The processor 210 is arranged to execute instructions to control the imaging sensor 202 and emitter 206 to capture depth images and/or RUB images. The processor 210 can also optionally be arranged to perform processing on these images, as outlined in more detail hereinafter.

The capture device 200 shown in FIG. 2 further includes a memory 212 arranged to store the instructions for execution by the processor 210, images captured by the depth camera 204 or RGB camera 208, or any other suitable information, images, or the like. In some examples, the memory 212 can include random access memory (RAM), read only memory (ROM), cache, Flash memory, a hard disk, or any other suitable storage component. The memory 212 can be a separate component in communication with the processor 210 or integrated into the processor 210.

The capture device 200 also comprises an output interface 214 in communication with the processor 210 and is arranged to provide data to a computing device 216 via a communication link. The computing device 216 can then perform the interpretation on the RGB and depth images, as outlined below. More detail on the structure of the computing device 216 is provided with reference to FIG. 6 below. The communication link can be, for example, a wired connection (such as USB, Firewire, Ethernet or similar) and/or a wireless connection (such as WiFi, Bluetooth or similar). In other examples, the output interface 214 can interface with one or more communication networks (such as the internet) and provide data to the computing device 216 via these networks.

Figure 3:
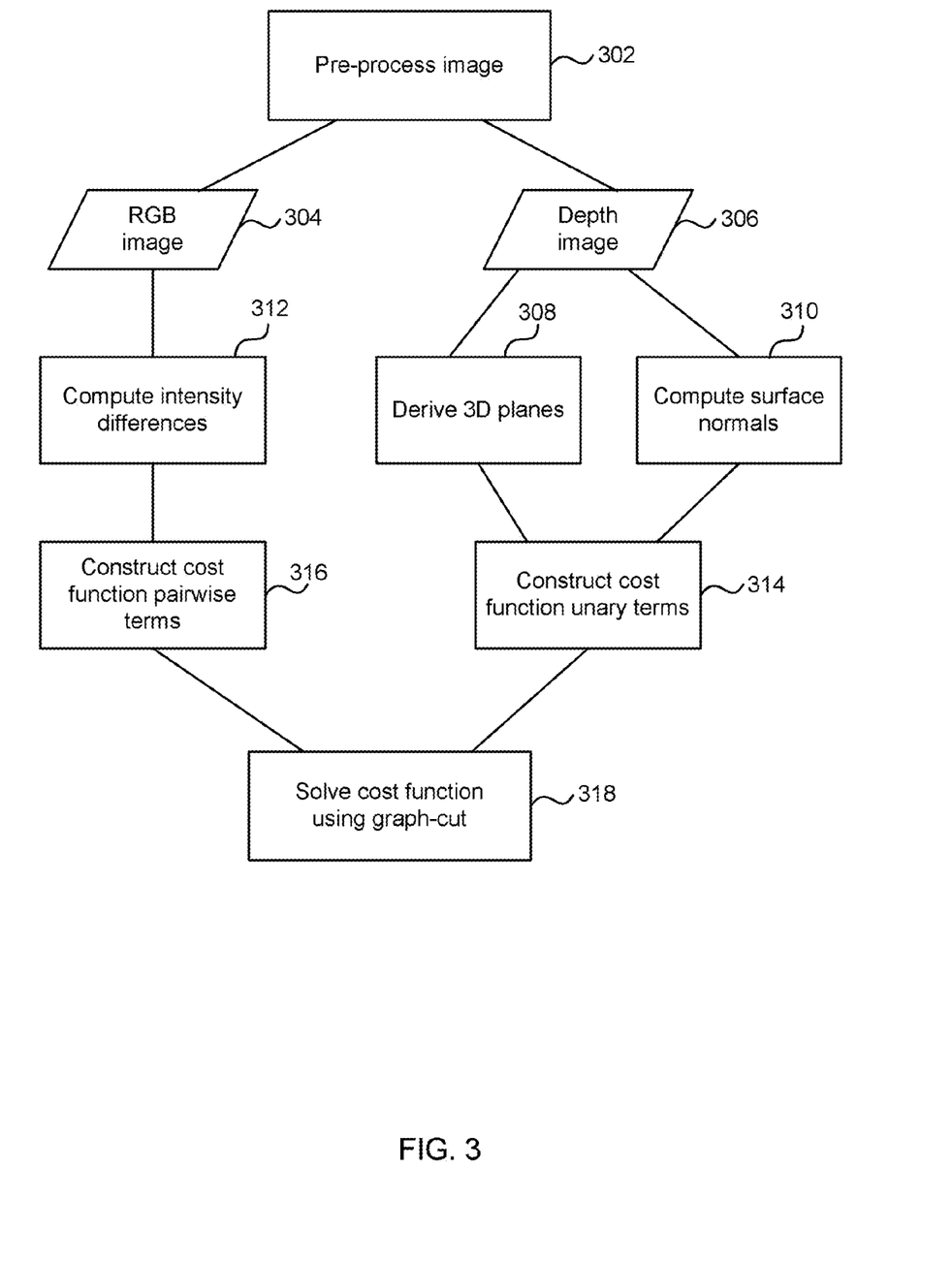
FIG. 3 illustrates an overall process for segmenting surfaces using the RGB and depth images.

Reference is now made to FIG. 3, which illustrates an overall process for segmenting surfaces and interpreting scenes using the RUB and depth images. The process of FIG. 3 initially pre-processes the RUB and depth images, and then performs separate calculations on the RGB and depth images. In FIG. 3, these separate calculations are shown in parallel, but they can also be performed sequentially. The output from the process of FIG. 3 is a set of 3D planes that are present in the scene, and a labeling of each image element indicating which, if any, plane the image element belongs to. The labeling of an image element is performed by evaluating a cost function. The cost function has terms dependent on both the RGB and depth value of the image element, and hence combines and simultaneously considers the RGB and depth information. More detail on the operation of this process is provided below.

Before describing the operation of this process in more detail, some notation is first outlined. In the following, $(u, v)$ defines a column and row of image element (e.g. pixel) coordinates in an image. $(X, Y, Z)$ or $XYZ$ or $X$ are 3D world coordinates (i.e. coordinates within the scene itself). $(N_X, N_Y,$ or $N_Z)$ or $N$ are 3D surface normals. $P=[a\ b\ c\ d]$ are 3D plane parameters. Each scene is considered to have a floor, a set of walls, and a set of supporting surfaces. Each of these surfaces are planar and are represented by a plane equation $aX+bY+cZ+d=0$, a 3D extent, and a set of pixel coordinates that indicate the visible region.

As noted, the first step in the process of FIG. 3 is to pre-process 302 the images. This pre-processing is now described in more detail with reference to FIG. 4. The input to the pre-processing operation is the RUB image 102 and the depth image 104, which are registered such that their corresponding image elements relate to the same point in the scene. If needed, registration of the depth image and RGB image can be performed using intrinsic and extrinsic parameters of the RGB and depth cameras and standard multi-view geometry techniques.

Figure 4:
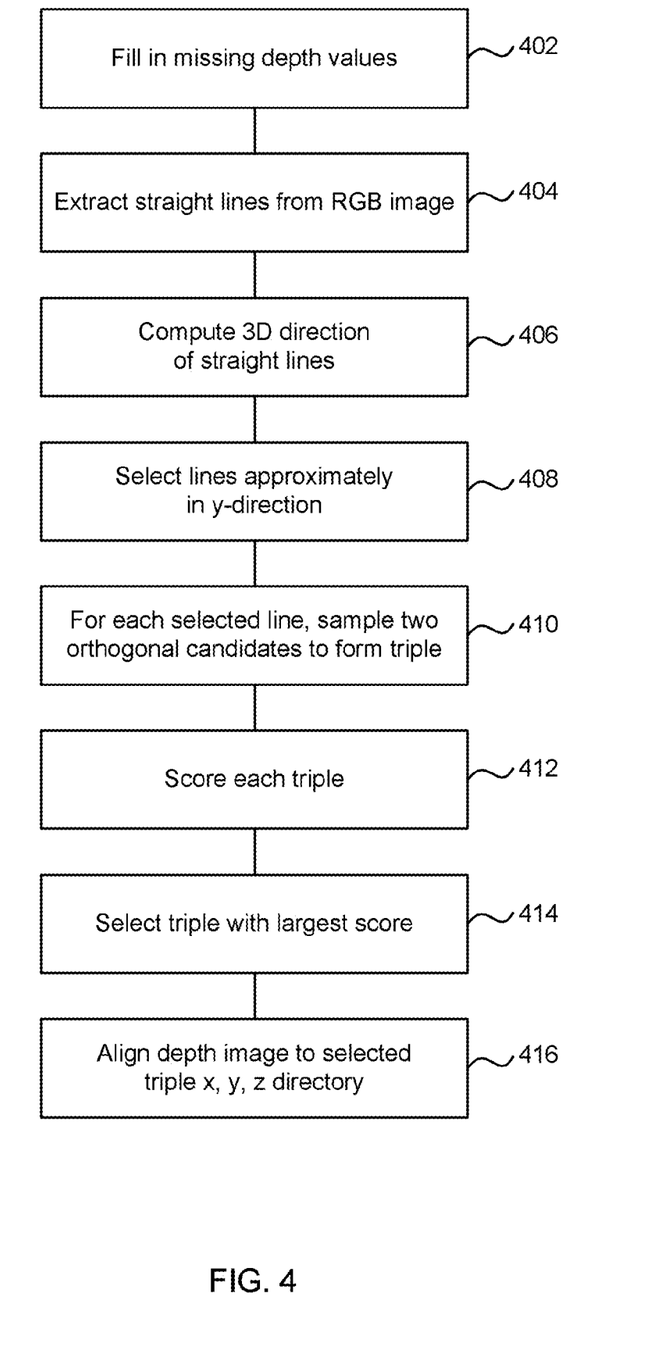
FIG. 4 illustrates a flowchart of a process for pre-processing the images prior to segmentation.

The depth image may have missing or noisy values as a result of the technique used (e.g. structured light) to determine the depth information. To correct this, missing depth values are filled-in 402. This can be performed using an inpainting technique in Which a missing depth value is found by propagating a nearby depth value along similar colors in the RGB image. As a result of filling-in missing depth values, at each image element there is now a color value and XYZ distance values, where the X and Y coordinates are computed from the image element coordinates (u, v), the depth Z (from the depth camera measurement), and the depth camera parameters of the known focal length f and optical center ($u_0$, $v_0$).

Next, before analyzing the scene, the image coordinates are aligned to room coordinates, such that the floor normal is in the Y (upward) direction. The alignment is based on the Manhattan world assumption that most visible surfaces, such as tables, the floor, and the walls, will be along one of three orthogonal directions (called the three principal directions). To obtain candidates for the principal directions, straight lines are extracted 404 from the RUB image, and the 3D direction of each of the extracted straight lines is computed 406. This can be performed using singular value decomposition (eigenvector with largest eigenvalue).

Often, this can result in a large number (e.g. 100-200) of candidates of principal directions. Lines that are approximately in the Y direction are selected 408, and for each selected line, two orthogonal candidates are sampled 410 to form a triple $v_1, v_2, v_3$. A score for each triple is calculated 412, using the following formula:

$$S(v_1, v_2, v_3) = \sum_{j=1}^{3}\left[\frac{w_N}{N_N}\sum_i \exp\left(-\frac{(N_i \cdot v_j)^2}{\sigma^2}\right) + \frac{w_L}{N_L}\sum_i \exp\left(-\frac{(L_i \cdot v_j)^2}{\sigma^2}\right)\right]$$

Where $v_1, v_2, v_3$ are the three principal directions, $N_i$ is the surface normal of an image element i, $L_i$ is the direction of a straight line, $N_N$ and $N_L$ are the number of surface points and lines, and $w_N$ and $w_L$ are predetermined weights of the 3D normal and line scores. In various examples, the following weights can be set (although alternatives can be used): $w_N=0.7$, $w_L=0.3$, and $\sigma=0.01$.

The set of principal direction candidates that has the largest score is selected 414, and denoted $v_X, v_Y, and v_Z$, where $v_Y$ is chosen to be the direction closest to the original Y direction. The 3D points, normals, and planes of the scene can then be aligned 416 to the principal directions of the room coordinates using the rotation matrix. $R=[v_X v_Y v_Z]$.

Returning to FIG. 3, following the pre-processing operation, the result is an RGB image 304 and a depth image 306, which are aligned to the room coordinates as outlined above. As mentioned above, several operations can then, operationally, be performed in parallel on the RGB and depth images, in order to calculate the terms used in the cost function. Firstly, the depth image is considered.

One operation performed using the depth image 306 is to derive 308 a set of three-dimensional planes that are present within the scene. This is performed by applying a random sample consensus (RANSAC) type algorithm to the depth image to generate a plurality of proposed planes and the set of planes are selected from these proposed planes based on the number of image elements having depth values with a threshold distance of the proposed planes. This process is now outlined in more detail with reference to FIG. 5.

Figure 5:
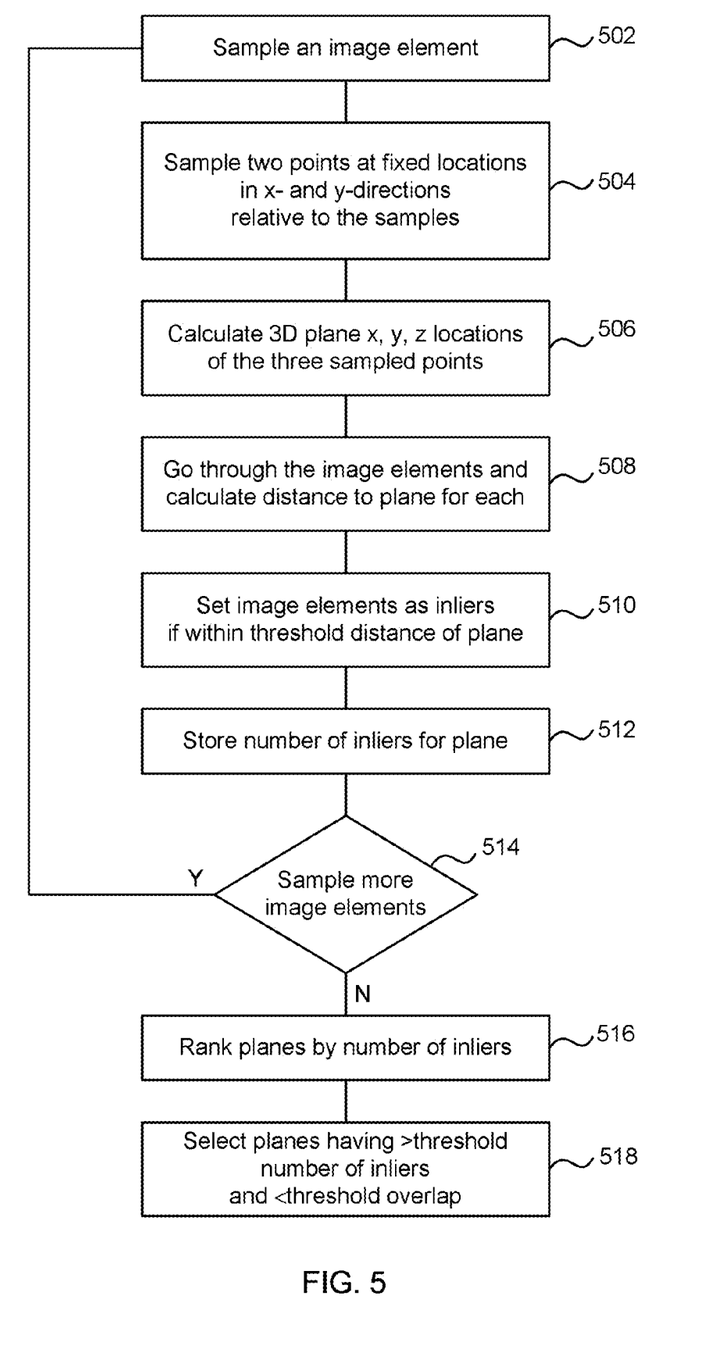
FIG. 5 illustrates a flowchart of a process for determining planes present in the image of the scene.

FIG. 5 illustrates a flowchart of a RANSAC process for determining the planes present in the image of the scene. A first image element from the depth image is sampled 502. In one example, the sampling can be random, or in other examples this can be based on a predefined pattern or sequence. A second and third image element are then sampled 504 at specified locations relative to the first image element. For example, the second image element can be sampled from a fixed distance in the y-direction from the first image element, and the third image element can be sampled from a fixed distance in the x-direction from the first image element. In one example, the fixed distance can be 20 pixels, although any suitable value can be used.

A proposed plane passing through the XYZ coordinates of each of the three sampled image elements is calculated 506. A distance between some or all of the other image elements and the three-dimensional plane is then determined 508. The proposed plane, P, is parameterized by [a b c d] with the plane equation $aX+bY+cZ+d=0$. The parameters are normalized such that $a^2+b^2+c^2=1$, such that the distance of a point (X, Y, Z) to the plane P is $|aX+bY+cZ+d|$.

An image element is set 510 as an "inlier" if it is within a threshold distance of the plane P. In one example, an image element is considered an inlier if its distance to the plane is within 0,005Z. The threshold is proportional to depth in this example because the distance resolution of the depth camera is coarser at larger depths. The number of inliers for the plane P are stored 512.

It is determined 514 whether more image elements are to be sampled. If so, then the process is repeated with a new starting sample. For example, a predefined number of different image elements can be sampled to ensure that enough planes are identified in the image. In one example, the process can be repeated several hundred times to generate a large number of proposed planes.

Once it is determined 514 that no more samples of the image elements are to be taken, then the stored number of inliers for each proposed plane are read, and ranked 516 by the number of inliers. A set of planes are then selected 518 from the proposed planes, where the set of planes represent surfaces that are believed to be present within the scene. In one example, the set of planes can be selected by selecting each proposed plane having greater than a threshold number of inliers (e.g. those having at least 2500 inliers). In another example, the set of planes can be selected by selecting a predetermined portion of the ranked list of planes (e.g. the top 50 ranking planes, or the top 5% of the ranked list). In further examples, additional factors can also (or alternatively) be taken into account, such as the degree of overlap between planes (e.g. a plane is not selected if there is more than a certain percentage of overlap with a higher-ranked plane).

The output of the process of FIG. 5 is therefore a set of planes that are considered to represent surfaces present within the scene. Returning again to FIG. 3, another process that is performed on the depth image 306 is a computation 310 of the surface normals at each image element of the depth image. The surface normal for an image element can be computing from the XYZ coordinates of the image element and the XYZ coordinates of at least two neighboring or surrounding image elements. For example, this can comprise fitting a least squares plane to the XYZ coordinates of the image element and some or all of the surrounding image elements using singular value decomposition, and determining the normal to this plane.

Moving to the operations performed on the RGB image 304 in FIG. 3, intensity differences between each image element and its surrounding image elements are computed 312. For example, a difference in intensity value can be calculated between the each image element and its surrounding eight image elements (known as the 8-connected neighborhood) and stored in association with the image element.

As mentioned above, in order to determine which image elements correspond to each plane, a cost function is constructed and evaluated. The cost function (which can also be referred to as an energy function) can be in the form of a conditional random field (CRF) having a unary term and a pairwise term. The unary term takes into consideration the information from the depth image, and determines whether the 3D coordinates and normal of a given image element are close to one of the planes from the set. The pairwise term takes into account the RGB intensity difference information, and smoothes the results based on the gradient in RGB intensity between image elements. Therefore, in the cost function, both RGB and depth image information is considered at the same time.

In one example, the following cost function can be used:

$$E(\text{data}, y) = \sum_{p \in PS} 1(y_i = p)\alpha_i \left[ \sum_i f_{3d}(X_i, y_i) + f_{norm}(N_i, y_i) \right] + \sum_{i,j \in N_8} f_{pair}(y_i, y_j)$$

Where data is the RGB and depth image data, y is an allocation of image elements to planes, $y_i$ is a plane label for image element i, where $y_i$=0 . . . $N_p$, where $N_p$ is the number of planes (0=no plane associated with the image element), PS is the set of derived planes, 1(·) is an indicator function, $\alpha_i$ is a weighting factor (discussed below). $f_{3d}(X_i, y_i)$ and $f_{norm}(N_i, y_i)$ are the unary terms, in which $X_i$ is the 3D coordinates of image element i and $N_i$ is the normal of image element i. $N_8$ is the 8-connected neighborhood of image element i and $f_{pair}(y_i, y_j)$ the pairwise term.

The unary term can be constructed 314 from the derived set of planes and the computed surface normals described above. The unary terms $f_{3d}$ and $f_{norm}$ encode whether the 3D values and normals at an image element match those of the plane. Each term is defined as log(Pr(dist|inlier)/Pr(dist|outlier)), i.e. the log ratio of the probability of the distance between the 3D point or normal to the plane's 3D point or normal, given that the pixel is an inlier or an outlier. In examples, the probabilities can computed using histograms with 100 bins, although other values can also be used. The unary terms are weighted by $\alpha_i$, according to whether the image element has a directly recorded depth measurements ($\alpha_i$=1), an interpolated depth measurement from the preprocessing ($\alpha_i$=0.25), or no depth measurement ($\alpha_i$=0).

The pairwise term can be constructed 316 using the RGB intensity differences described above. In examples, the pairwise term can be given by $f_{pair}(y_i, y_j)=\beta_1+\beta_2\|I_i-I_j\|^2$. The value for $\beta_1$ and $\beta_2$ can be set to any suitable value. In one example, $\beta_1$=1 and $\beta_2$=45/$\mu_g$, where $\mu_g$ is the average squared difference of intensity values for pixels connected within the 8-connected neighborhood.

The cost function can be solved 318 by finding an allocation of plane identifier (or zero) to each image element such that the value of the cost function is minimized. This can be solved using a graph-cut algorithm. In one example, a graph cut with alpha expansion can be used to minimize the cost function. Once this has been solved, each image element has an associated plane identifier, which indicates the plane to which the image element belongs, or, alternatively, an indicator that the image element does not belong to one of the derived planes. In some examples, other types of algorithm can be used to minimize the cost function instead of a graph-cut algorithm. For example, the cost function can be minimized using a tree weighted message passing algorithm, using a belief propagation algorithm, by solving linear programming relaxations, or by applying any other suitable algorithm.

The allocation of each image element to an indicator either belongs to a plane or does not belong to a plane can be used to assist further segmentation of the image. For example, all the image elements that are allocated to a plane can be removed, such that only those that are not allocated to a plane are left. This is can be considered to be representative of image elements of non-planar objects that are within the scene. In other words, this leaves the image elements that relate to objects that are placed on the surfaces of the scene. For example, referring again to FIG. 1, the image elements of the cup 114 and ball 116 would not be allocated to a plane, and hence can be readily segmented from the image for further processing.

In one example, image elements that do not relate to a plane can be segmented, and different groups of image elements (that are likely to relate to different objects) can be separated. Classification algorithms such as SVM or decision forests can be applied to each group of image elements determine a type of object to which the group of image elements relate (e.g. that the image elements show a cup).

In various examples, the knowledge of the planes present in the scene, as derived as described above, can be used to derive further information about the scene. For example, each of the 3D planes present within the scene can be extended to determine where the different planes intersect, and the furthest intersections (in terms of distance) in each of the x, y and z directions from the capture device can be determined. These furthest intersections indicate the extent of the indoor scene, i.e. where the bounding walls meet the floor/ceiling and each other. This therefore allows the extent of the room to be determined, even if this is occluded from direct observation by objects in the scene.

Figure 6:
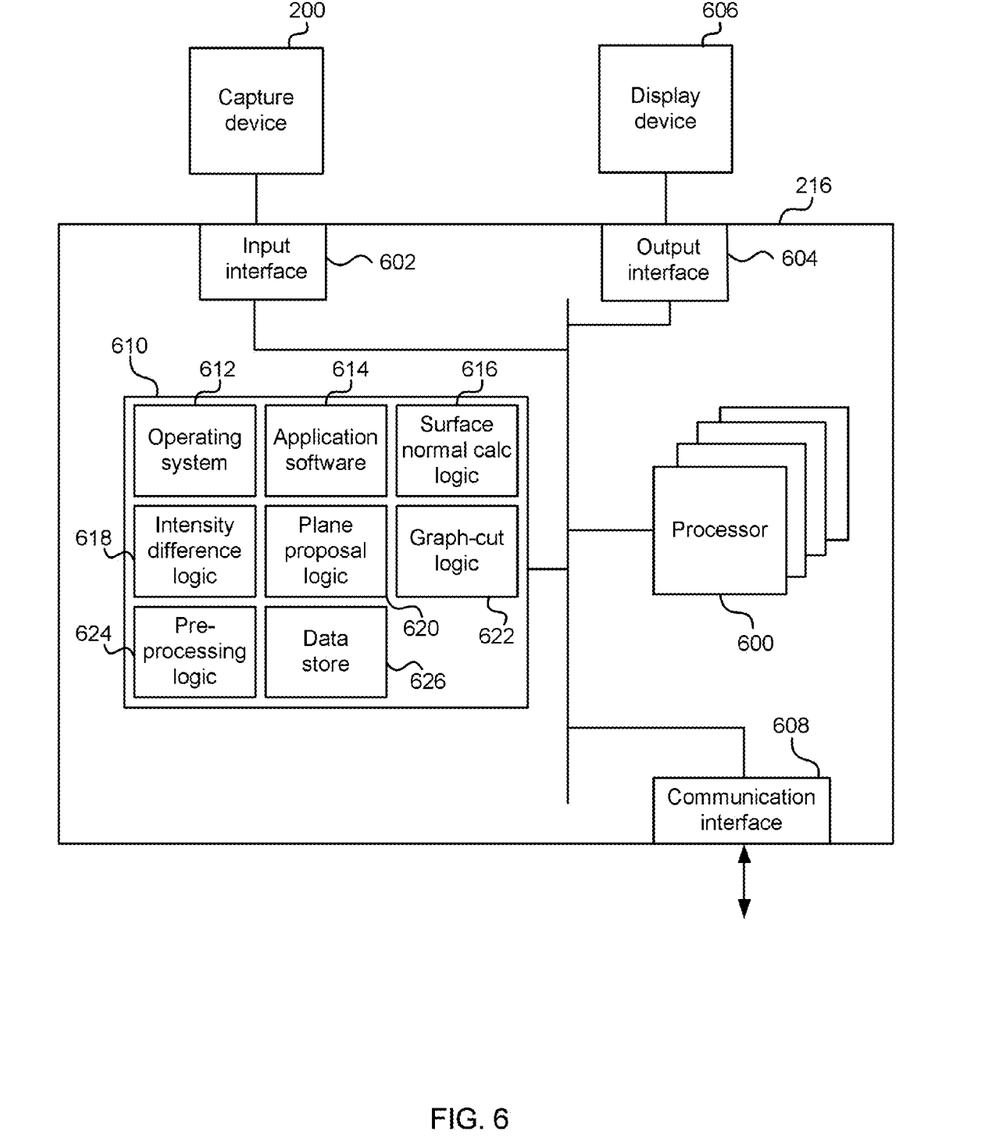
FIG. 6 illustrates an exemplary computing-based device in which embodiments of the surface segmentation technique may be implemented.

Reference is now made to FIG. 6, which illustrates various components of an exemplary computing device 216 which may be implemented as any form of a computing and/or electronic device, and in which embodiments of the image segmentation techniques may be implemented.

The computing device 216 comprises one or more processors 600 which may be microprocessors, controllers, graphics processing units or any other suitable type of processors for processing computing executable instructions to control the operation of the device in order to perform the above-described image segmentation techniques.

The computing device 216 also comprises one or more input interfaces 602 arranged to receive and process input from one or more devices, such as capture device 200 (and optionally one or more of a game controller, a keyboard and/or a mouse).

The computing device 216 also comprises an output interface 604 arranged to output display information to a display device 606 which can be separate from or integral to the computing device 216. The display information may provide a graphical user interface. In an example, the display device 606 may also act as a user input device if it is a touch sensitive display device. The output interface may also output data to devices other than the display device, e.g. a locally connected printing device (not shown in FIG. 6). The device also comprises communication interface 608, which may send or receive data over one or more communication networks.

The computer executable instructions may be provided using any computer-readable media that is accessible by computing device 216. Computer-readable media may include, for example, computer storage media such as memory 610 and communications media. Computer storage media, such as memory 610, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 610) is shown within the computing device 216 it will be appreciated that the storage may be distributed or located remotely and accessed via a network or other communication link (e.g. using communication interface 608).

Platform software comprising an operating system 612 or any other suitable platform software may be provided at the computing device 216 to enable application software 614 to be executed on the device. Other software that can be executed on the computing device 216 includes: surface normal calculation logic 616 for determining surface normals from the depth images, intensity difference logic 618 for calculating RGB intensity differences between neighboring image elements, plane proposal logic 620 for determining planes present in the scene (see FIG. 5), graph-cut logic 622 for solving the cost functions, and pre-processing logic 624 for pre-processing the images (see FIG. 4). A data store 626 is provided to store data such as the RGB and depth images, derived plane parameters, surface normals, intensity differences and other data.

The term 'computer' is used herein to refer to any device with processing capability such that it can execute instructions. Those skilled in the art will realize that such processing capabilities are incorporated into many' different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of image segmentation comprising:
   receiving, at a processor, an image of a scene comprising a plurality of image elements, each image element having an associated color value and an associated depth value representing a distance between from an image sensor to a scene element;
   applying a weighted line scoring calculation to a plurality of straight lines extracted from the image to determine the principal directions for the image, the weighted line scoring calculation accounting for at least the surface normal of an image element, the direction of a straight line associated with the image element, and a plurality of predetermined weights;
   using the depth values to derive a set of three-dimensional planes present within the scene; and
   for each image element, determining whether the image element belongs to a plane from the set and labeling the image element accordingly, wherein the determining comprises evaluating a cost function over the set of planes having terms dependent on the depth value of the image element, the cost function having terms at least related to the number of planes, the set of derived planes, a unary term related to the 3D coordinates of the image element, and a unary term related to the normal of the image element, and the color value of the image element and at least one neighboring image element.

2. A method according claim 1, wherein the step of evaluating the cost function comprises selecting an associated plane for each image element such that the cost function is minimized.

3. A method according claim 1, wherein the cost function comprises a unary term and a pairwise term.

4. A method according claim 3, wherein the step of evaluating comprises calculating the unary term using the depth value for the image element, and calculating the pairwise term using the color value of the image element and at the least one neighboring image element.

5. A method according claim 4, wherein the color value is a red-green-blue intensity value.

6. A method according claim 5, further comprising the step of, for each image element, computing an intensity difference between the red-green-blue intensity value of the image element and the red-green-blue intensity value of the at least one neighboring image element.

7. A method according claim 6, wherein the step of calculating the pairwise term uses the intensity difference.

8. A method according claim 1, wherein the cost function is a conditional random field.

9. A method according claim 1, wherein the step of evaluating the cost function comprises computing a graph-cut algorithm to minimize the cost function.

10. A method according claim 9, wherein the graph-cut algorithm is an alpha-expansion algorithm.

11. A method according claim 1, wherein using the depth values to derive a set of three-dimensional planes present within the scene comprises applying a RANSAC procedure using the depth values to generate a plurality of proposed planes, and selecting the set of planes from the proposed planes based on the number of image elements having depth values with a threshold distance of the proposed planes.

12. A method according claim 11, wherein the RANSAC procedure comprises:
   i) selecting three sampled image elements from the image;
   ii) fitting a three-dimensional plane to the depth values of the sampled image elements;
   iii) determining a distance between the depth values of at least a portion of the image elements and the three-dimensional plane
   iv) setting those image elements within a threshold distance of the plane as inliers;
   v) storing the number of inliers for the plane; and
   repeating steps i) to v) for a plurality of different sampled image elements.

13. A method according claim 1, further comprising the step of, for each image element, computing a surface normal value from the depth value for the image element and the depth value for at least two neighboring image elements.

14. A method according claim 13, wherein the step of computing a surface normal value comprises fitting a least squares plane to the depth value for the image element and the depth value for the at least two neighboring image elements using singular value decomposition, and determining the normal to this plane.

15. A method according claim 1, further comprising the steps of;
   extending the three-dimensional planes present within the scene to determine intersections between the planes;
   determining the furthest intersections from the image sensor; and
   setting the furthest intersections as the extent of the scene.

16. A method according claim 1, further comprising the step of labeling the image element as an object if the image element does not belong to one of the planes.

17. An image segmentation system, comprising:
   an input interface arranged to receive an image of a scene from a capture device, the image comprising a plurality of image elements, each image element having an associated color value and an associated depth value representing a distance between from the capture device to a surface in the scene;
   at least one processor arranged to apply a weighted line scoring calculation to a plurality of straight lines extracted from the image to determine the principal directions for the image and to use the depth values to derive a set of three-dimensional planes present within the scene, and, for each image element, determine whether the image element belongs to a plane from the set and label the image element accordingly, the weighted line scoring calculation accounting for at least the surface normal of an image element, the direction of a straight line associated with the image element, and a plurality of predetermined weights,
   wherein the at least one processor is arranged to determine whether the image element belongs to a plane by evaluating a cost function over the set of planes, the cost function having terms at least related to the number of planes, the set of derived planes, a unary term related to the 3D coordinates of the image element, and a unary term related to the normal of the image element.

18. A system according to claim 17, wherein the capture device comprises a depth camera and an RGB camera.

19. A system according to claim 18, wherein the depth camera comprises at least one of: a structured light emitter; a time-of-flight camera; and a stereo camera.

20. One or more tangible device-readable media with device-executable instructions that, when executed by a computing system, direct the computing system to perform steps comprising:
   receiving an image of a scene comprising a plurality of image elements from a combined RGB and depth camera, each image element having an associated RGB intensity value and an associated depth value representing a distance between from the depth camera to a scene element;
applying a weighted line scoring calculation to a plurality of straight lines extracted from the image to determine the principal directions for the image, the weighted line scoring calculation accounting for at least the surface normal of an image element, the direction of a straight line associated with the image element, and a plurality of predetermined weights;
using a random sample consensus process on the depth values to derive a set of three-dimensional planes present within the scene; and
for each image element, determining whether the image element belongs to a plane from the set, and, if so, labeling the image element with a plane identifier, and, if not, labeling the image element as an object,
wherein the determining comprises evaluating a cost function over the set of planes having terms dependent on the depth value of the image element, the cost function having terms at least related to the number of planes, the set of derived planes, a unary term related to the 3D coordinates of the image element, and a unary term related to the normal of the image element.

* * * * *